United States Patent [19]

Dewey et al.

[11] Patent Number: 5,199,878
[45] Date of Patent: Apr. 6, 1993

[54] PLUG-IN JACK CARD FOR NORMALLY CLOSED CONTACTS

[75] Inventors: James D. Dewey, Plymouth; Dennis M. Burroughs, Savage; Kevin A. Rademacher, Lakeville; Daniel Rivera, Sr., Eden Prairie, all of Minn.

[73] Assignee: ADC Telecommunications, Inc., Minneapolis, Minn.

[21] Appl. No.: 614,143

[22] Filed: Nov. 15, 1990

[51] Int. Cl.⁵ .................. H01R 29/00; H01R 9/09; H02B 1/056; H05K 7/14
[52] U.S. Cl. .................................... 439/49; 361/415; 439/61; 439/188; 439/668; 379/1; 379/329; 379/332
[58] Field of Search ............ 379/326, 327, 328, 329, 379/330, 331, 332, 397, 1, 457; 361/390, 391, 415; 439/188, 49, 61, 668

[56] References Cited

U.S. PATENT DOCUMENTS

| | | | |
|---|---|---|---|
| 4,017,770 | 4/1977 | Valfre | 379/329 X |
| 4,087,151 | 5/1978 | Robert et al. | 439/188 |
| 4,106,841 | 8/1978 | Vladic | 439/188 |
| 4,286,121 | 8/1981 | Olszewski et al. | 379/329 |
| 4,514,030 | 4/1985 | Triner et al. | 439/188 |
| 4,840,568 | 6/1989 | Burroughs et al. | 439/49 |
| 4,941,165 | 7/1990 | Rademacher et al. | 379/1 |

FOREIGN PATENT DOCUMENTS

| | | | |
|---|---|---|---|
| 0243296 | 10/1987 | European Pat. Off. | |
| 0364658 | 4/1990 | European Pat. Off. | |
| 2115237 | 9/1983 | United Kingdom | 379/328 |
| 2133938 | 8/1984 | United Kingdom | 439/188 |

Primary Examiner—James L. Dwyer
Assistant Examiner—Harry S. Hong
Attorney, Agent, or Firm—Merchant, Gould, Smith, Edell, Welter, & Schmidt

[57] ABSTRACT

An apparatus is disclosed for providing access to plurality of telecommunication lines. The apparatus includes a frame which carries a plurality of normally closed contacts. The telecommunication lines are terminated on the normally closed contacts. A plurality of modules are provided to be releasably attached to the frame with electrical circuit elements on the modules engaging the normally closed contacts to open the contacts and create a new signal path through the module upon insertion of the module into the frame.

9 Claims, 11 Drawing Sheets

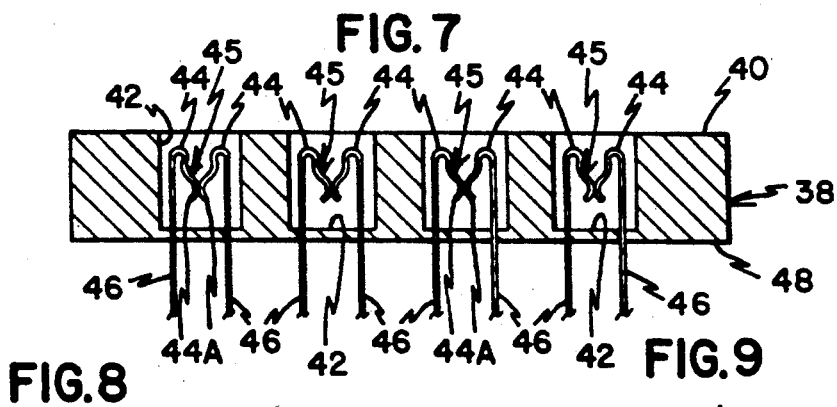
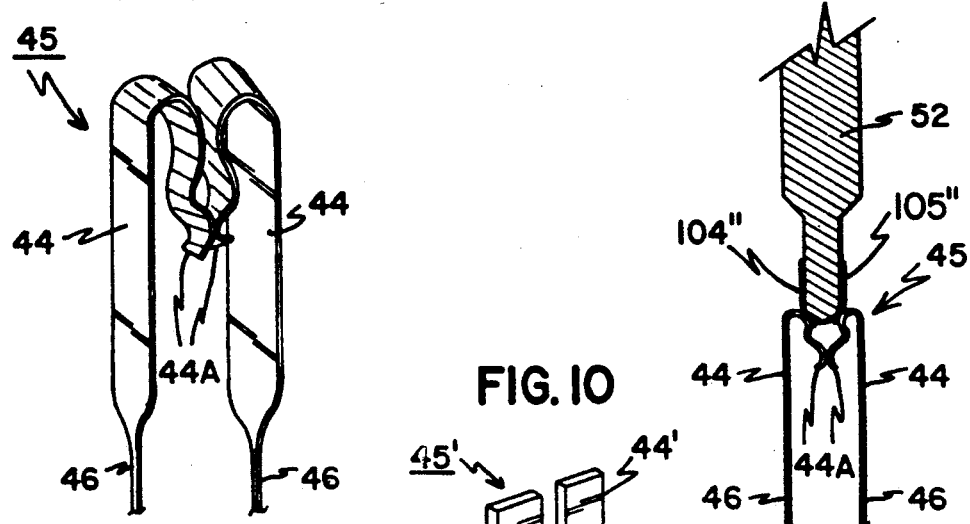
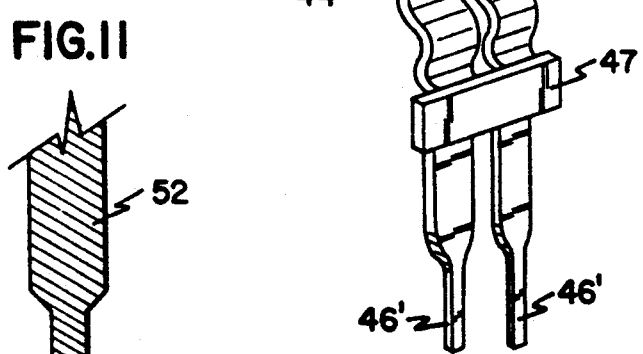
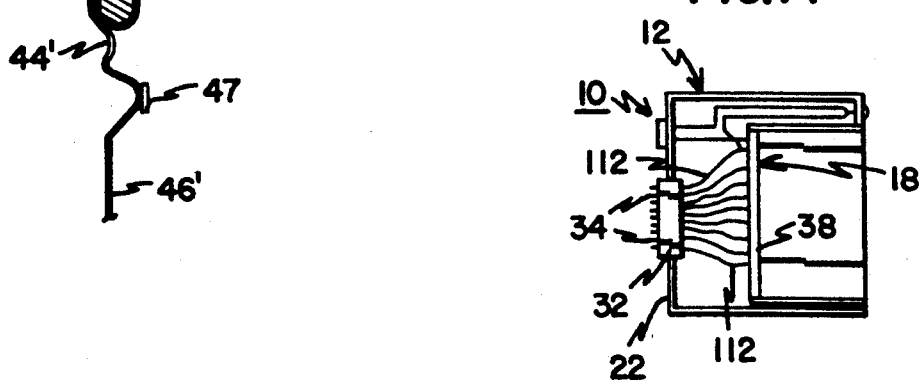

CROSS CONNECT TO
DIGITAL NETWORK
EQUIPMENT OR DCS 5,199,878

1

PLUG-IN JACK CARD FOR NORMALLY CLOSED CONTACTS

BACKGROUND OF THE INVENTION

1. Field of the Invention

This invention pertains to the telecommunications industry. More particularly, this invention pertains to a digital distribution apparatus for use in a telecommunications network.

2. Description of the Prior Art

The telecommunications industry requires cross-connecting and switching functions for a variety of equipment. Historically, the industry has utilized manually operated digital system cross-connect (DSX) apparatus for connecting two or more units of telecommunications equipment. The DSX equipment could provide cross-connect, monitoring, and other access functions to the telecommunication network.

In recent years, the telecommunications industry has considered the implementation of electronic digital signal cross-connect (EDSX) equipment to replace conventional manual DSX equipment. An example of a method for replacing DSX equipment with EDSX is shown in commonly assigned U.S. Pat. No. 4,941,165 entitled "Hot Cut Procedure For Telecommunication Network".

When utilizing EDSX equipment, it is desirable to retain opportunities for manual cross-connect as well as test access and monitoring functions independent of the EDSX equipment. It is an object of the present invention to provide such an apparatus. Also, it is an object of the present invention to provide line access equipment which may be used independent of an EDSX apparatus.

SUMMARY OF THE INVENTION

According to a preferred embodiment of the present invention an apparatus is disclosed for providing access to a plurality of telecommunication lines. The apparatus includes a frame which carries a plurality of normally closed contacts. The telecommunication lines are terminated on the normally closed contacts. A plurality of modules are provided to be releasably attached to the frame with electrical circuit elements on the modules engaging the normally closed contacts to open the contacts and create a new signal path through the module upon insertion of the module into the frame.

BRIEF DESCRIPTION OF THE DRAWINGS

FIG. 7 is a view taken along line 7—7 in FIG. 6;

FIG. 8 is a perspective view of a normally closed pair of spring contacts for use in the present invention;

FIG. 9 is a view showing the spring contacts of FIG. 8 in a position about to be opened by insertion of a card;

FIG. 10 is a perspective view of an alternative pair of spring contacts for use with the present invention;

FIG. 11 is a view of the spring contacts of FIG. 10 about to be opened by insertion of a card;

FIG. 14 is a view showing in cross-section the frame of FIG. 12;

DESCRIPTION OF THE PREFERRED EMBODIMENT

Referring now to the several drawing figures in which identical elements are numbered identically throughout, a description of the preferred embodiment of the present invention will now be provided.

Figure 1:
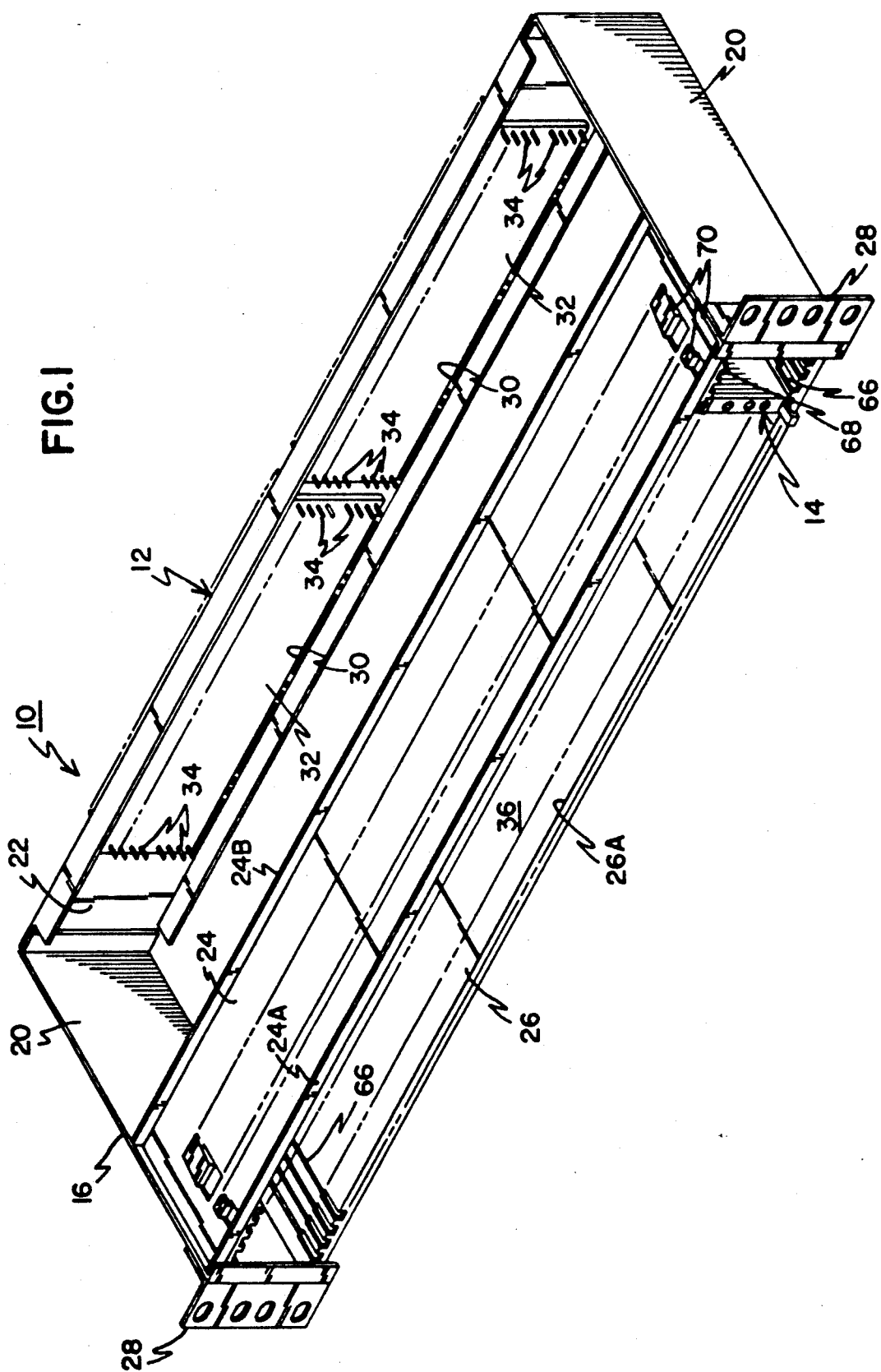
FIG. 1 is a front, top and right side perspective view of an apparatus according to the present invention.
Figure 2:
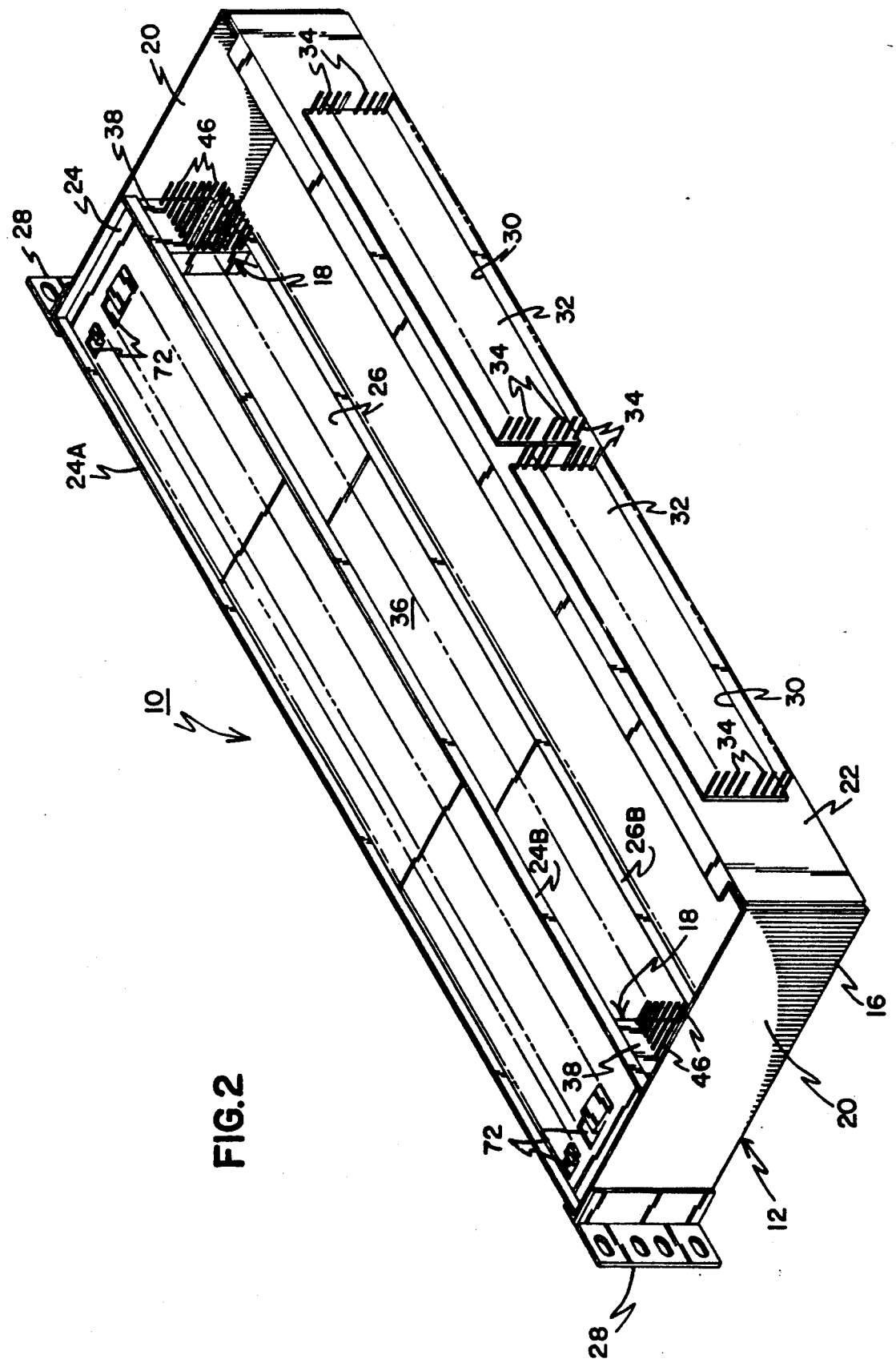
FIG. 2 is a rear, top and right side perspective view of the apparatus of FIG. 1.
Figure 3:
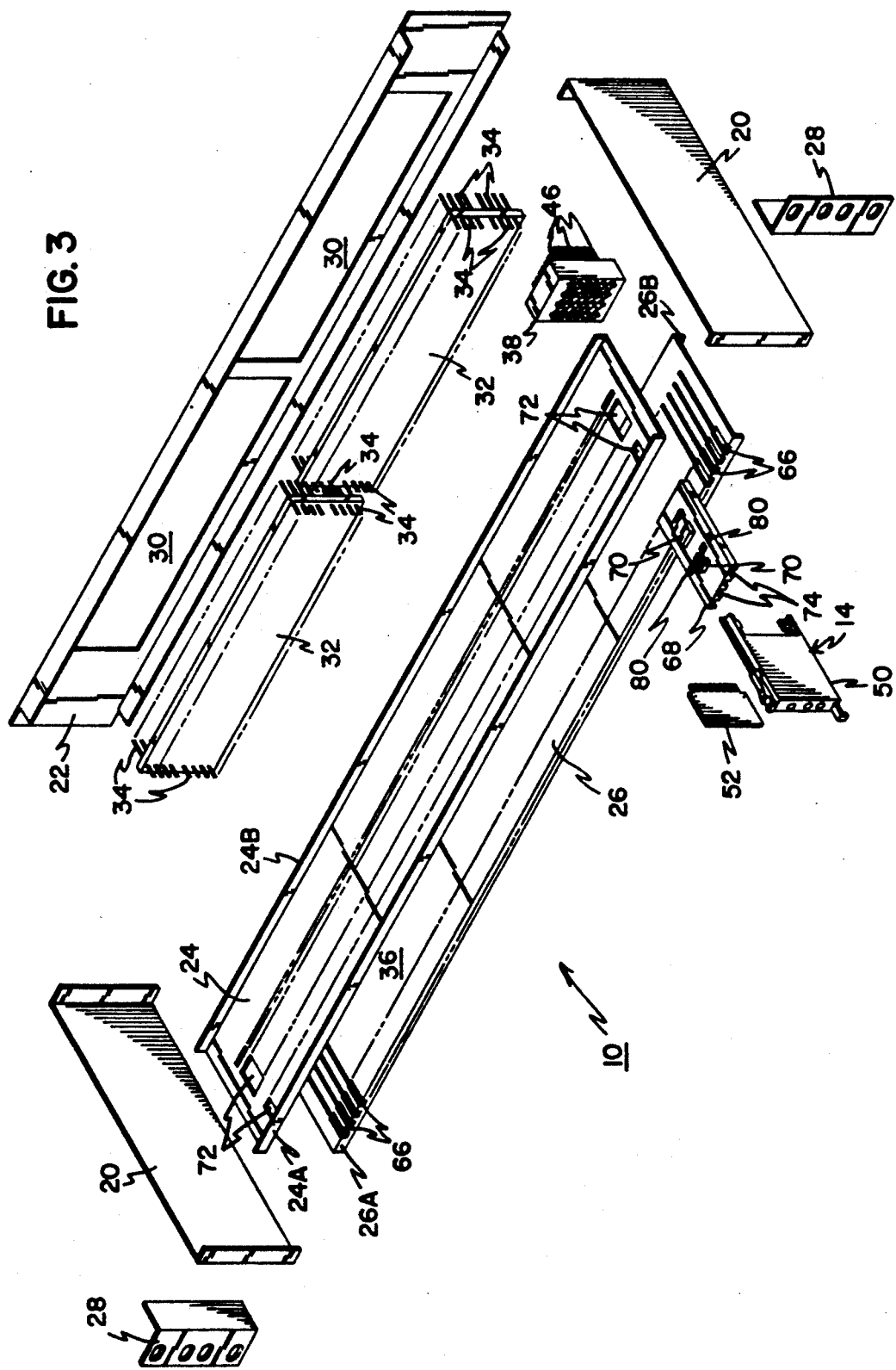
FIG. 3 is an exploded perspective view of the apparatus of FIG. 1.

With initial reference to FIGS. 1–3, the apparatus 10 is shown as including a frame 12 and a plurality of modules or jack cards 14 (only one of which is shown in FIGS. 1 and 3). As will be more fully described, the frame 12 includes a chassis 16 and a plurality of connector assemblies 18 (only two of which are shown in FIG. 2 and only one of which is shown in FIG. 3).

Chassis 16 is preferably formed of sheet metal and includes spaced apart side walls 20 connected by a rear wall 22, a forward top panel 24 and a forward bottom panel 26. Side flanges 28 are connected to side walls 20 to permit the chassis 16 to be mounted in stacked vertical array with a plurality of other chassis (not shown) in a mainframe or bay (not shown).

Rear wall 22 is provided with openings 30 therethrough sized to receive termination blocks 32. Blocks 32 are provided with wire wrap termination pins 34 extending therethrough. It will be appreciated that termination blocks having termination pins such as blocks 32 and pins 34 are well known in the art and form no part of this invention per se.

As shown in FIGS. 1–3, top panel 24 and bottom panel 26 are spaced apart to define a jack card receiving area 36 which extends between sidewalls 20 and from leading edges 24A,26A of panels 24,26, respectively, to be trailing edges 24B,26B.

Figure 5:
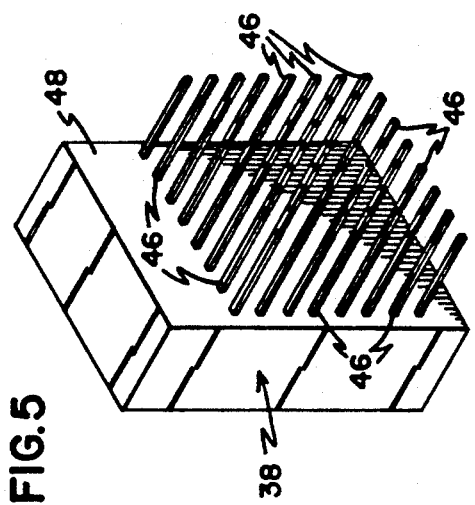
FIG. 5 is a rear, top and right side perspective view of a connector assembly for use in the apparatus of FIG. 1.
Figure 6:
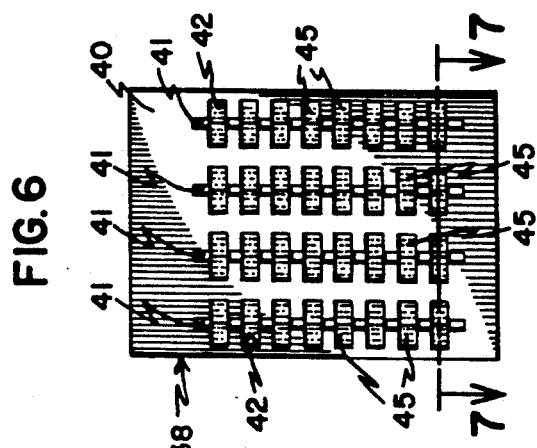
FIG. 6 is a front elevation view of the connector assembly of FIG. 5.

The connector assembly 18 includes a block dielectric body 38 shown best in FIGS. 5 and 6. The forward face 40 of the block body 38 is provided with a plurality of vertical slots 41 each having a plurality of vertically aligned contact receiving chambers 42. The chambers 42 each receives a pair of spring contacts 44 which cooperate to define a normally closed switch 45 (illustrated best in FIG. 7).

The spring contacts 44 are provided with wire wrap termination pins 46 which extend through the rear face 48 of block 38 as best shown in FIG. 5.

As shown in FIG. 2, the block bodies 38 are disposed in side-by-side relation within the jack card receiving area 36. The bodies are sized to have a vertical dimension for the body 18 to extend between top and bottom panels 24,26. The bodies 18 are disposed adjacent the trailing edges 24B,26B with the pins 46 extending away from area 36.

Figure 4:
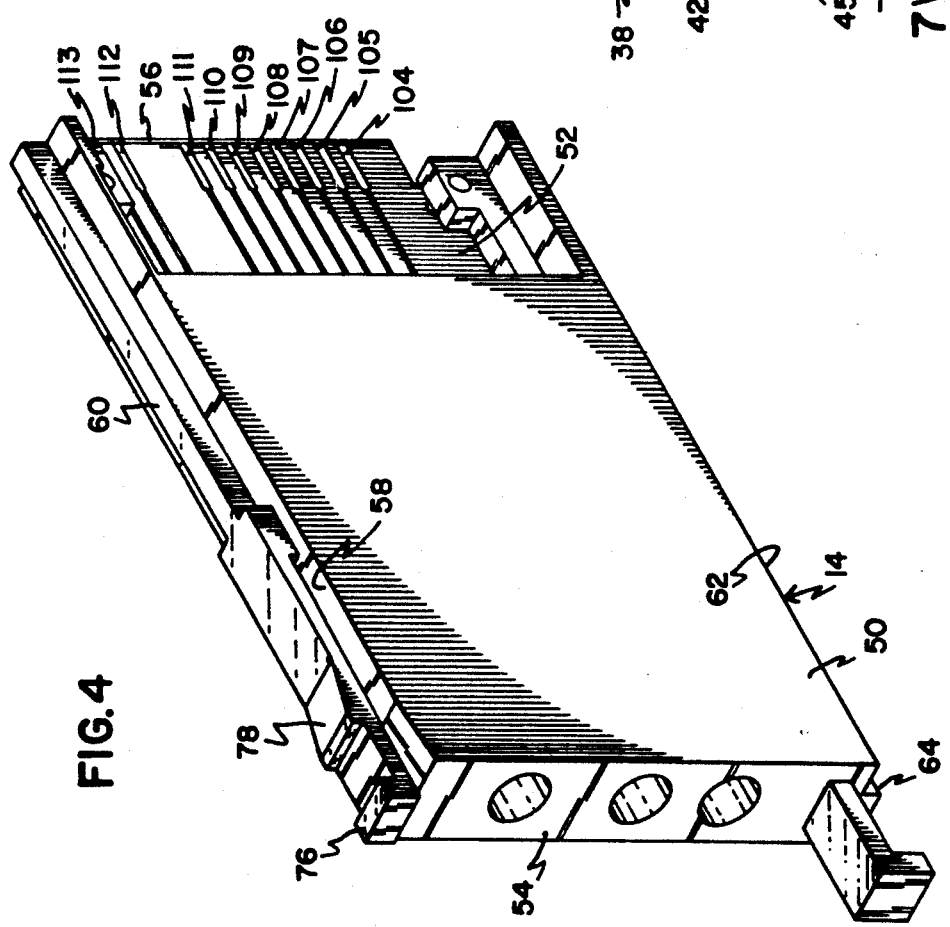
FIG. 4 is a perspective view of a jack card for use in the apparatus of FIG. 1.
Figure 4A:
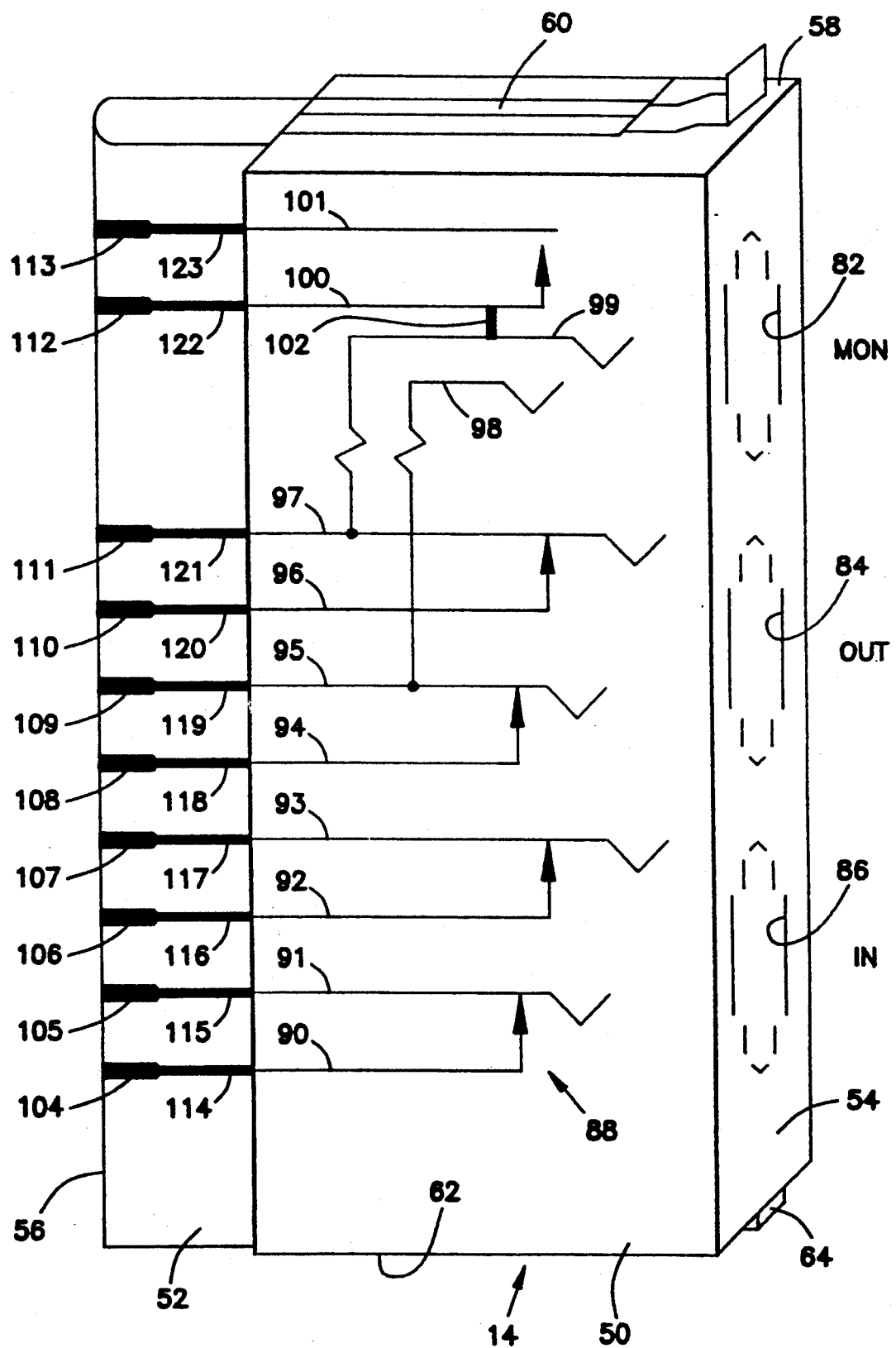
FIG. 4A is a schematic view of a jack card showing electrical circuit elements carried by the jack card.

Referring now to FIGS. 4 and 4A, the jack cards 14 include a dielectric body 50 which carries a printed circuit board card 52. The jack card 14 extends from a leading edge 54 of body 50 to a trailing edge 56 of card 52. An upper edge 58 of body 50 is provided with an axially extending rail 60. A lower edge 62 of body 50 is provided with a lower rail 64 (only a portion of which is shown in FIG. 4) similar in structure to that of rail 60.

The vertical dimension (i.e., the distance between upper edge 58 and lower edge 62) of jack card 14 is selected for the card to be received within area 36 with upper edge 58 opposing panel 24 and with lower edge 62 opposing panel 26. Bottom panel 26 is provided with a plurality of transverse slots 66 sized to slidably receive lower rail 64 (see FIGS. 1 and 3). The connector assembly 18 includes an upper slotted rail guide 68. Guide 68 is provided with clips 70 disposed to align with openings 72 formed in upper panel 24. Accordingly, the rail guide 68 is to be retained against an inner surface of upper panel 24. The rail guide 68 is provided with a plurality of transverse slots 74 (shown in FIG. 3 only) sized to slidably receive rail 60.

As shown in FIGS. 1-3, slots 66, rail guide 68 and back panel 18 are disposed for the elements of each to cooperate for jack card 14 to be slidably received between panels 24,26 and with the trailing edge 56 of card 52 receivable within a vertical slot 41 of body 38. Retaining clips 76 are provided on the jack in body 14. The clips 76 have ramps 78 which are releasably received within openings 80 formed in rail guide 68 to releasably secure jack card 14 in an inserted position in jack card receiving area 36 (as shown in FIG. 1).

Forward edge 54 of jack card 14 is provided with a plurality of holes or ports extending therethrough. The plurality of ports includes a monitor (or MON) port 82, an OUT port 84 and an IN port 86. As shown in FIG. 4A, the jack card carries an electrical circuit 88 which includes a plurality of spring contacts.

The plurality of spring contacts includes an IN tip normal spring 90 and an IN tip spring 91. The plurality also includes an IN ring normal spring 92 and an IN ring spring 93, an OUT tip normal spring 94 and an OUT tip spring 95. The plurality also includes an OUT ring normal spring 96 and an OUT ring spring 97, a monitor tip spring 98, a monitor ring spring 99, a first LED spring 100 and a second LED spring 101.

Springs 91 and 93 are disposed to be engaged by the tip and ring, respectively, of an electrical jack plug (not shown) inserted within the IN port 86. Springs 95,97 are selected to be engaged by the tip and ring of a plug, not shown, inserted within the OUT port 84. Similarly springs 98,99 are disposed to be engaged by the tip and ring of a plug, not shown, inserted within the MON port 82. Spring pairs 90-91, 92-93, 94-95, and 96-97 are in normal contact in the absence of a plug within either of ports 84,86 and will be opened by insertion of a plug. Springs 98,99 are connected across a resistance to springs 95,97. Spring 100 is engaged into electrical contact with spring 101 by means of spring 99 urging spring 100 via a dielectric pusher 102 against spring 101. Springs such as springs 90-101 are retained within dielectric body 50 in a manner similar to springs retained in a body such as that shown in commonly assigned U.S. Pat. No. 4,840,568.

The trailing edge 56 of card 52 is provided with a plurality of electrical contact pads 104-113 which are connected to springs 90-97 and 100-101, respectively, via circuit paths 114-123. As will become apparent, the use of LED springs 100,101 may be optional. In this event, contacts pads 112,113 could be eliminated. (To illustrate this option, the block 38 includes vertical columns of eight spaces 42 to accommodate only pads 104-111). In addition to permitting test access and monitoring (as will be described), the circuit boards 52 may be provided with additional electrical circuitry (such as repeaters or other circuit enhancement circuitry).

As previously mentioned, a plurality of spring contacts 44 are retained within the chambers 42 of assembly 18. Paired spring contacts 44 cooperate to define normally closed spring switches 45. Namely, the spring contacts pairs 44 are in electrical engagement on the absence of a card within slots 41.

The normally closed spring contacts 44 are best illustrated in FIGS. 7 and 8 where the contact ends 44a are shown in electrical engagement in the absence of a card 52 within the chambers 42. Preferably, the spring contacts 44 are also so-called make-before-break normally closed spring contacts which make electrical contact with a pad such as pads 104-111 before breaking or opening the electrical connection across the spring contacts 44. FIG. 9 shows a card 52 with pads 104", 105" in electrical contact with spring contacts 44 before forcing the spring contacts 44 apart upon full insertion of the card 52.

FIGS. 10 and 11 show an alternative arrangement for a make-before-break normally closed spring contact pairs with spring contacts 44' connected across a shunt bar 47. FIG. 11 shows electrical contact being made with the cards 44' before the spring contacts 44' are urged away from the shunt bar 47.

In FIGS. 4 and 4A, the contact pads 104-113 are shown on the same side of the card 52 for purposes of clarity of the illustrations. With this arrangement, the card 52 is used in conjunction with side-by-side paired contacts 44' as shown in FIGS. 10 and 11. If opposing paired contacts 44 (as shown in FIGS. 7-9) are used the pads 104-113 are disposed on opposite sides of the card 52 (as illustrated by pads 104", 105" in FIG. 9).

Figure 12:
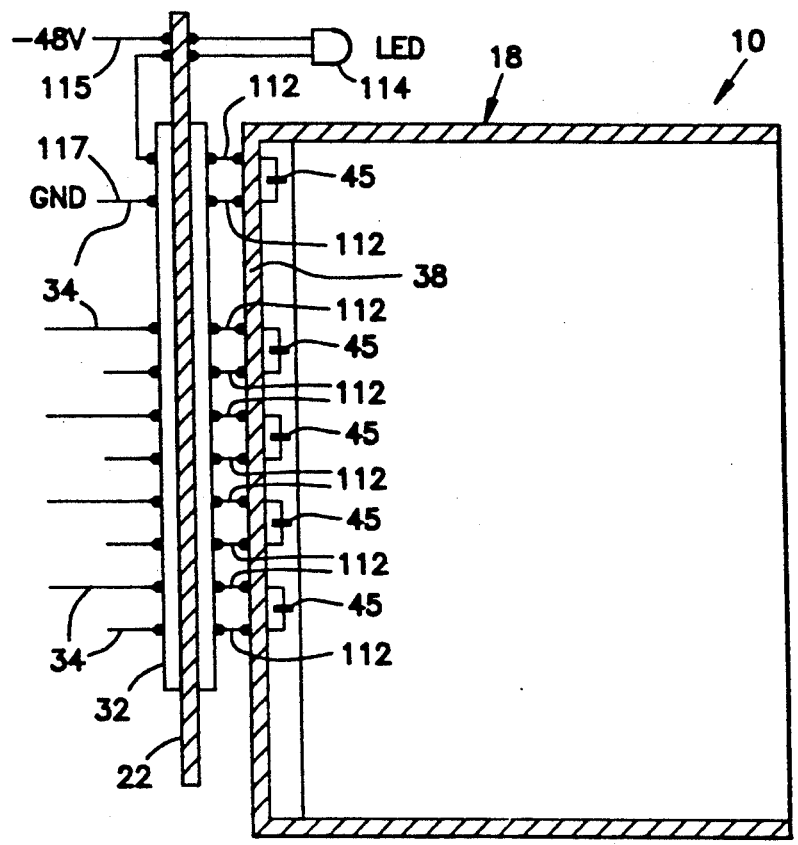
FIG. 12 is a schematic cross-sectional view of a frame for use with the present invention.
Figure 13:
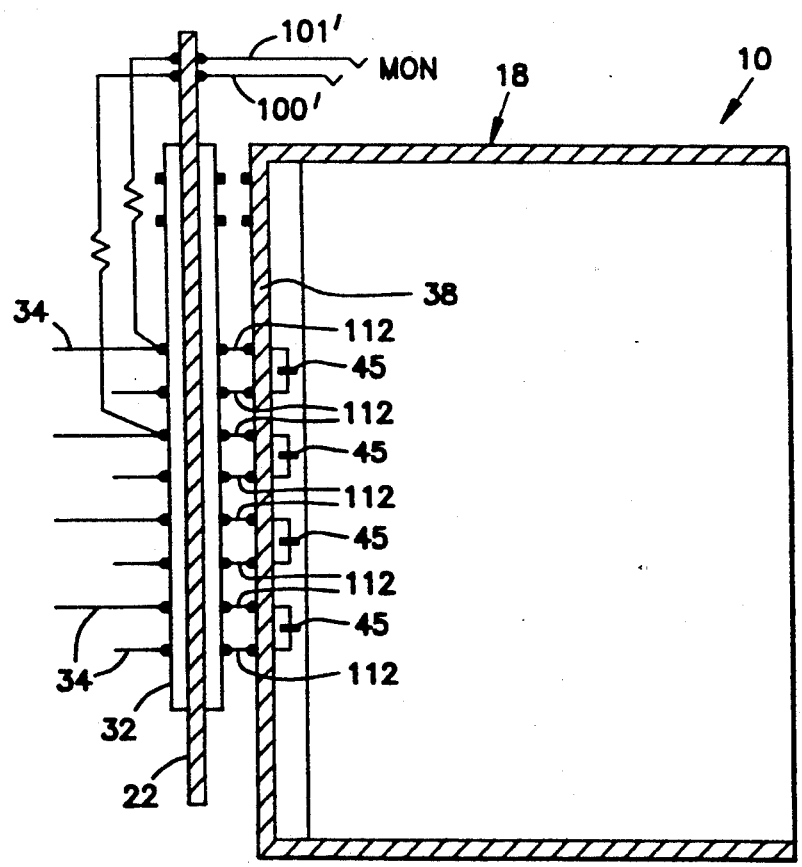
FIG. 13 is an alternative embodiment of the frame of FIG. 12.

The wire wrap termination pins 46 of the connector assembly 18 are hard wired to the wire wrap termination pins 34 of the termination blocks 32 by wire conductors 112 as shown in FIG. 14 (and as schematically shown in FIGS. 12 and 13). FIGS. 12 and 13 shown in schematic format are alternative embodiments of the invention. FIG. 12 is shown for use with the jack card 14 of FIG. 4A which includes the MON port 82 with monitor springs 100,101. With that embodiment, the frame 12 is provided with an LED 114 connected via springs 100,101 to a voltage source 115 and a ground 117. The LED is illuminated upon insertion of a plug in the MON port 82. Alternatively, monitor springs can be omitted from the jack card 14 with monitor springs 100',101' carried by the frame 12 (as shown in FIG. 13).

With the apparatus thus described, tip and ring conductors of a telecommunications network may be terminated on the wire wrap termination pins 34 of blocks 32. The pins 34 are hard wired to the spring switches 45 which are normally closed. As a result, a signal flows through the apparatus 10 without modification or access in the absence of a jack card 14. The presence of a jack card 14 results in the signal now flowing through the circuitry 88 of the jack card 14. Insertion of a plug into ports 82,84,86 permits monitoring and test access to the telecommunications network in a manner similar to that provided by DSX equipment such as that shown in U.S. Pat. No. 4,840,568. The reader will note a significant difference between the structure of the present invention in the aforementioned U.S. Pat. No. 4,840,568 is that the spring contacts of the connector assembly of the aforementioned patent (items 300 in the aforementioned patent) do not include normally closed pairs of contacts. As a result, the prior DSX apparatus was not suitable for signal through in the absence of spring carrying jack cards.

Figure 22:
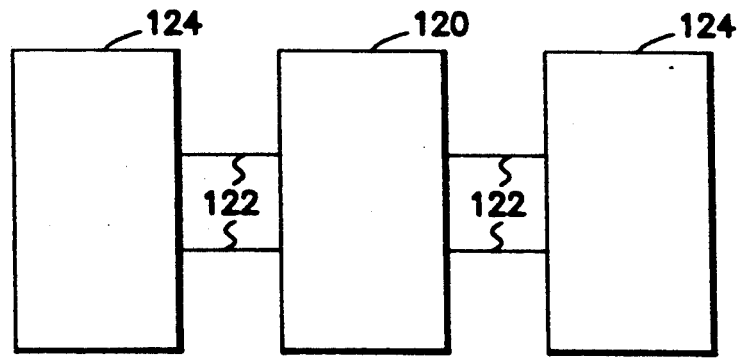
FIG. 22 shows, in schematic format, a telecommunications network with a manual DSX in places.
Figure 23:
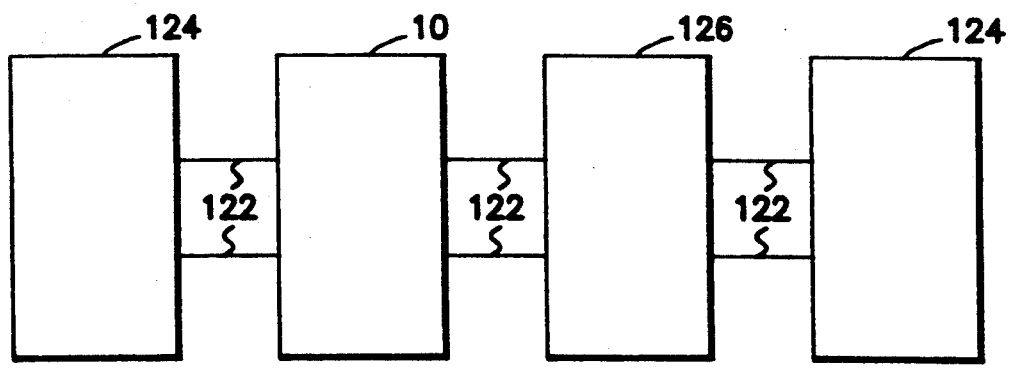
FIG. 23 shows, in schematic format, a telecommunications network with an EDSX in use in conjunction with an apparatus of the present invention.

The present apparatus is particularly suitable for use in conversion of prior art DSX networks to updated DCS networks. (Those skilled in the art will recognize DCS ("Digital Cross-Connect Systems") to include EDSX as well as DACS ("Digital Access Cross-Connect Systems"). As previously mentioned, commonly assigned U.S. Pat. No. 4,941,165, teaches a method for replacing manual DSX equipment with electronic DSX equipment (EDSX). Utilization of a so-called hot cut procedure as described in U.S. Pat. No. 4,941,165 permits replacement of the manual DSX with the DCS without service interruption. FIG. 22 shows a DSX equipment bay 120 connected through tip and ring lines 122 to network equipment 124. FIG. 23 shows the DSX replaced with an EDSX 126 and an apparatus 10 of the present invention. With the embodiment shown in FIG. 23, the apparatus 10 (in the absence of jack cards 14) provides signal flow through the apparatus 10 between the equipment 124 and the EDSX 126. Insertion of jack cards 14 within the apparatus 10 permits manual test access and monitoring as well as optional circuit enhancement without interference with the EDSX 126. The manual access capability is particularly desirable in the event of disfunction of EDSX equipment 126.

Figure 15:
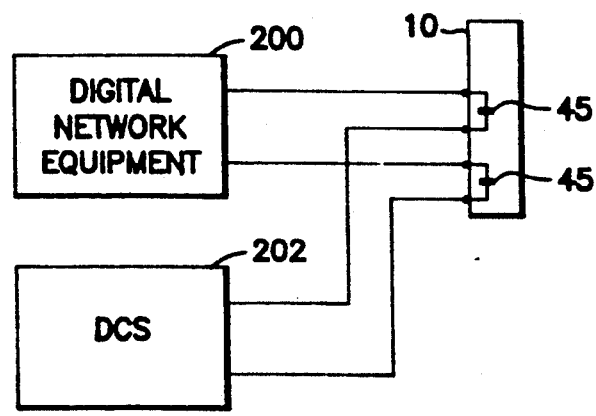
FIG. 15 is a schematic representation of a first use of the apparatus of the present invention in a telecommunications network.
Figure 16:
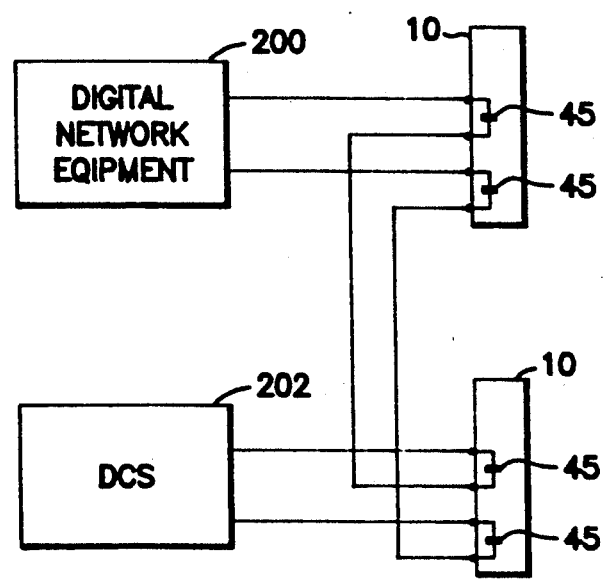
FIG. 16 is a schematic representation of a second use of the apparatus of the present invention in a telecommunications network.
Figure 17:
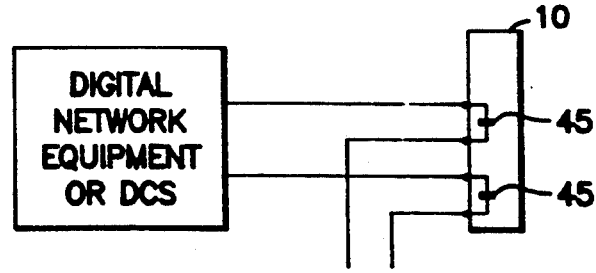
FIG. 17 is a schematic representation of a third use of the apparatus of the present invention in a telecommunications network.

FIG. 15 illustrates use of the apparatus 10 for test access where the spring contacts 44 are shown normally closed and jack cards 14 are not inserted within the frame. In the embodiment of FIG. 15, the apparatus 10 provides a simple flow-through of a signal between network equipment 200 and a DCS 202. At the option of a user, the signal may be accessed by insertion of a jack card 14 into apparatus 10. FIG. 16 shows use of the apparatus 10 in an interconnect function. FIG. 17 shows use of the apparatus in a cross-connect function.

An alternative structure of the present invention is to provide for a jack card 14 which may be flipped in its orientation to reverse the test access capabilities of the jack card. Such an embodiment is shown in FIGS. 18 and 19.

Figure 18:
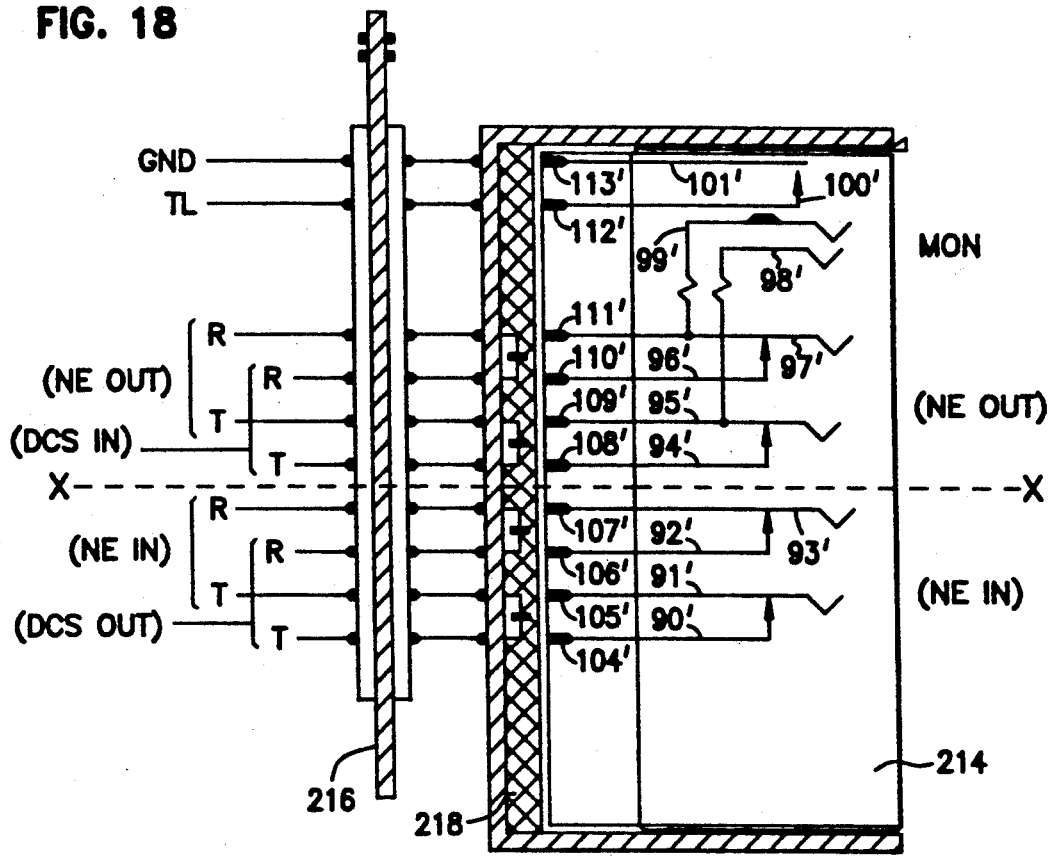
FIG. 18 is a schematic representation, taken in cross-section, of the apparatus of the present invention with an embodiment of a reversible jack card shown in a first position.

In FIG. 18, a reversible jack card 214 is shown inserted within connector assembly 218 which is carried by chassis 216. The IN and OUT conductor pads (i.e. pads 104'-111' connected to springs 90'-97') are shown symmetrically arranged about a rotational axis X—X. The card 214 may be reversed about axis X—X and reinserted. With this embodiment, the card 214 may be inserted in its first or upright position as shown in FIG. 18. Upon insertion of a plug into the IN, OUT or monitor ports of jack card 214, the jack card will function similar to that of the embodiment of FIG. 4A. However, the present embodiment permits the jack card 214 to be rotated about axis X—X and be inserted in the inverted position as in FIG. 19. This permits alternative test access (indicated by the designations in FIGS. 18 and 19 of "NE OUT" and "NE IN" for network equipment IN and OUT and "DCS IN" and "DCS OUT" for Digital Cross-Connect System IN and OUT). Also, the monitor port is now connected to alternatively the OUT or the IN equipment lines depending upon the orientation of the card 214. In the embodiment shown in FIG. 19, the LED spring contacts are not in electrical contact upon flipping of the jack card assembly. However, an alternative embodiment to that design would be an inclusion of ground and tracer light leads disposed to electrically engage the pads when the jack card is in the flip position of FIG. 19.

Figure 19:
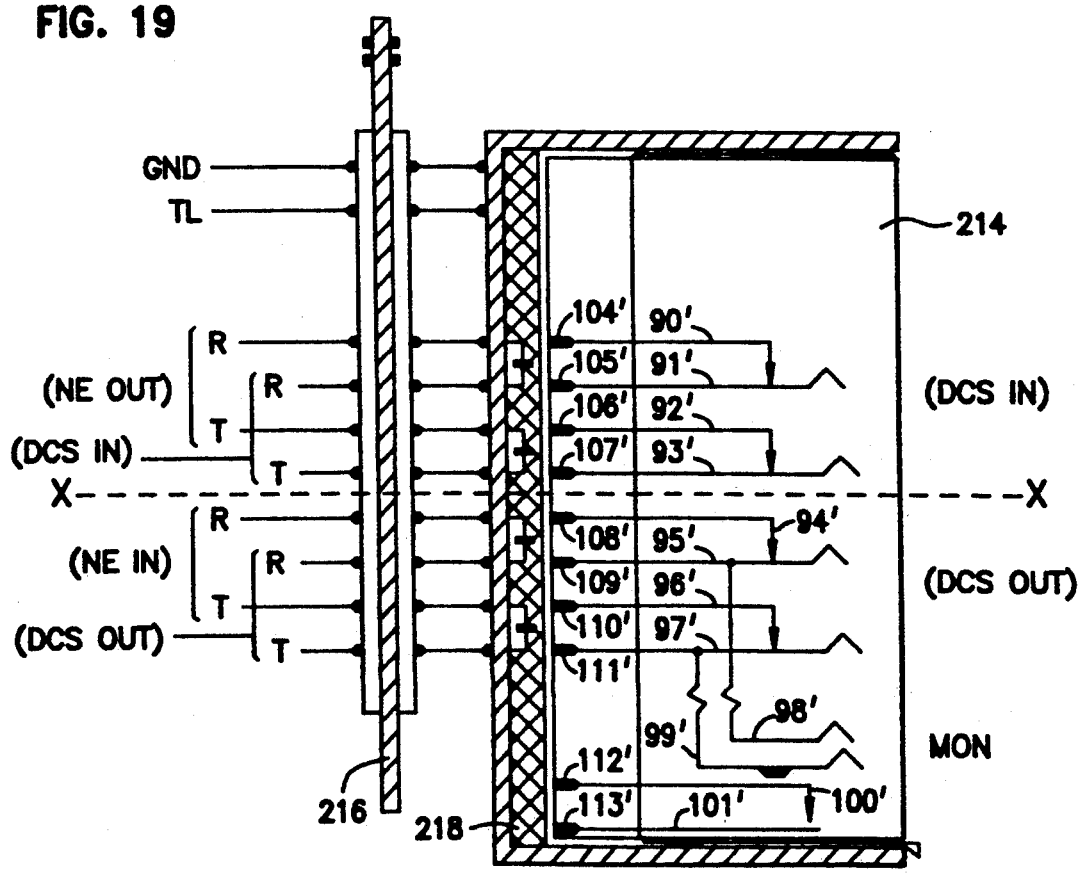
FIG. 19 is the view of FIG. 18 with the jack card shown in a flipped position.
Figure 20:
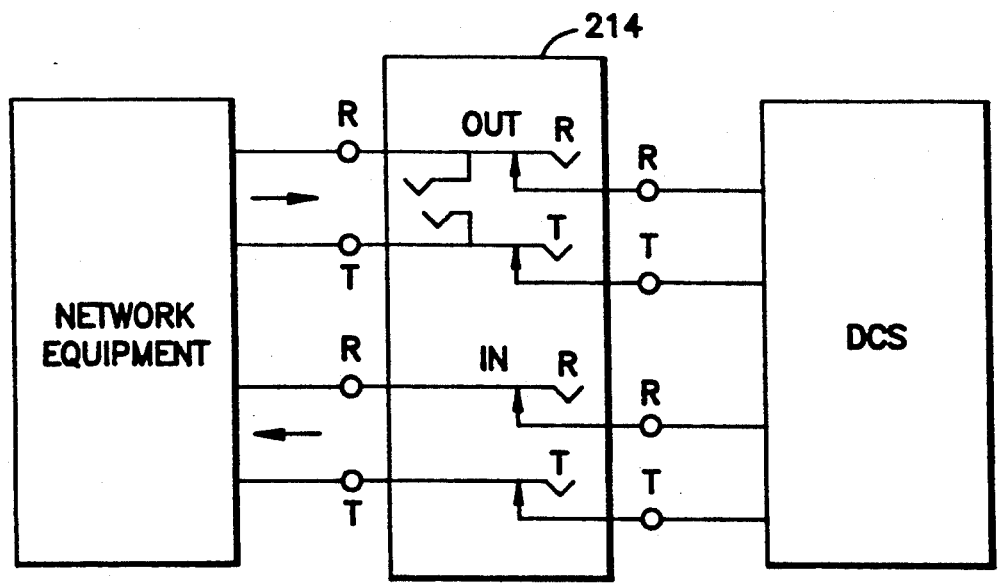
FIG. 20 is a schematic representation of the apparatus of FIG. 18 in a telecommunications network.
Figure 21:
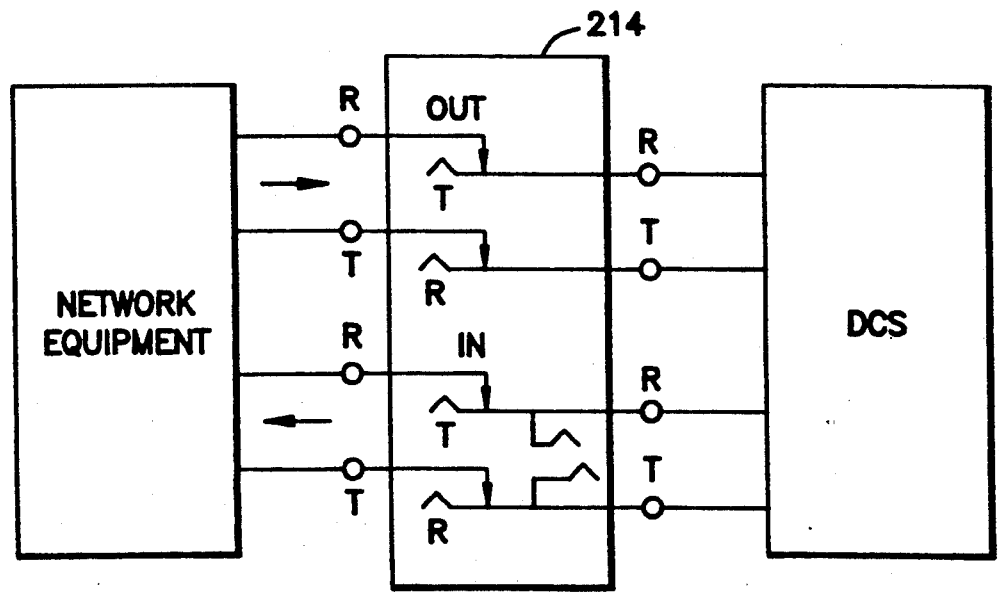
FIG. 21 is a schematic representation of the apparatus of FIG. 19 in a telecommunications network.

FIGS. 20 and 21 show use of the apparatus of FIGS. 18 and 19 in a network indicating alternate directions for test access and monitoring dependent upon flipping of the jack card assembly 214.

Having described the present invention in a preferred embodiment it has been shown how the objects of the invention have been attained. However, modifications and equivalents of the disclosed concepts which will readily occur to one skilled in the art are intended to be included within the scope of the claims.

What is claimed is:

1. An apparatus for providing access to a plurality of telecommunications lines, said apparatus comprising:
   a frame;
   a plurality of normally closed contacts carried on said frame, each of said contacts having electrical connection means for terminating said lines on said contacts, said plurality of contacts including a plurality of pairs of first and second contacts biased into electrical connection for a signal flow on lines terminated at said first and second contacts of a pair to pass through said first and second contacts of said pair, said plurality of pairs including an IN pair and an OUT pair;
   a plurality of modules, each having means for releasably securing itself to said frame and each having circuit interruption means on a first side thereof for opening said normally closed contacts against said bias upon securing itself to said frame;
   each of said modules including circuit means having at least an IN pair of first and second IN springs and an OUT pair of first and second OUT springs with springs of a pair biased into normally closed electrical contact,
   a plurality of electrically conductive contact locations disposed on said module, said plurality electrically conductive contact locations including at least a pair of first and second IN contact locations and a pair of first and second OUT contact locations, said locations disposed for said first IN contact location to electrically engage said first IN contact, said second IN contact location to electrically engage said second IN contact, said first OUT contact location to electrically engage said first OUT contact and said second OUT contact location to electrically engage said second OUT contact upon said securing of said module to said frame;

said circuit means further including means for electrically connecting said first IN spring to said first IN contact location, said second IN spring to said second IN contact location, said first OUT spring to said first OUT contact location and said second OUT spring to said second OUT contact location; and access means on said module for receiving a plug at either an IN or an OUT location on a second side of said module with a plug received at said IN location separating and electrically engaging said first and second IN springs and with a plug insert at said OUT location separating and electrically engaging said first and second OUT springs.

2. An apparatus according to claim 1 wherein said means for releasably securing said module to said frame includes means for alternatively securing said module to said frame in either of a first or a second orientation; said IN pair of contact locations, said OUT pair of contact locations, said IN pair of contacts and said OUT pair of contacts mutually disposed for said IN pair of springs to electrically connect with said IN pair of contacts and for said OUT pair of springs to electrically connect with said OUT pair of contacts when said module is connected to said frame in said first orientation and said contact locations and contacts further mutually disposed for said IN pair of springs to electrically connect with said OUT pair of contacts and for said OUT pair of springs to electrically connect with said IN pair of contacts when said module is connected to said frame in said second orientation.

3. An apparatus according to claim 2 wherein said circuit means includes a monitor spring electrically connected to at least one of said OUT springs, a monitor access location for receiving a plug in electrical contact with said monitor spring, said circuit including means for monitoring a signal on said at least one of said OUT springs at said monitor spring without interruption of said signal.

4. An apparatus according to claim 1 wherein said normally closed contacts are make-before-break normally closed contacts.

5. An apparatus according to claim 1 wherein said circuit means includes a monitor spring electrically connected to at least one of said OUT springs, a monitor access location for receiving a plug in electrical contact with said monitor spring, said circuit including means for monitoring a signal on said at least one of said OUT springs at said monitor spring without interruption of said signal.

6. In a telecommunications network, an improvement comprising:
a first telecommunications apparatus;
a second telecommunications apparatus;
a digital cross-connect system apparatus;
a plurality of telecommunication lines connecting said first apparatus, said digital cross-connect system apparatus and said second apparatus, respectively, in series;
a third telecommunication apparatus disposed in series between said digital cross-connect system apparatus and either of said first or second telecommunications apparatus, said third apparatus including a plurality of normally closed contacts having electrical connection means for terminating said plurality of lines on said contacts said plurality of contacts including a plurality of pairs of first and second contacts biased into electrical connection for a signal flow on lines terminating at said first and second contacts of a pair to pass through said first and second contacts of said pair, said plurality of pairs including at least an IN pair and an OUT pair;
a plurality of modules, each having means for releasably connecting itself to said contacts and each having circuit interruption means for opening said contacts upon connection of itself to said contacts;
a plurality of electrically conductive contact locations disposed on said module and including at least a pair of first and second IN contact locations and a pair of first and second OUT contact locations, said locations disposed for said first and second IN contact locations to electrically engage said first and second, respectively, IN contacts and for said first and second OUT contact locations to electrically engage said first and second, respectively, OUT contacts when said module is connected to said contacts in at least a first orientation;
each of said modules including circuit means having at least an IN pair of first and second IN springs electrically connected to said first and second, respectively, IN contact locations and an OUT pair of first and second OUT springs electrically connected to said first and second, respectively, OUT contact locations, springs of a pair biased into electrical contact; and
access means on said module for receiving a plug at either an IN or an OUT location on said module with a plug received at said IN location separating and electrically engaging said first and second IN springs and with a plug inserted at said OUT location separating and electrically engaging said first and second OUT springs.

7. A network according to claim 6 wherein said circuit means includes a plurality of plug contacts disposed in a Digital Signal Cross-Connect (DSX) plug contact array.

8. A network according to claim 6 wherein said normally closed contacts are make-before-break contacts.

9. A network according to claim 6 wherein said circuit means includes a monitor spring electrically connected to at least one of said OUT springs, a monitor access location for receiving a plug in electrical contact with said monitor spring, said circuit including means for monitoring a signal on said at least one of said OUT springs at said monitor spring without interruption of said signal.

* * * * *